United States Patent [19]
Bistrick et al.

[11] 4,102,244
[45] Jul. 25, 1978

[54] POT BROACH

[75] Inventors: Eugene J. Bistrick; Axel B. Abrahamsson, both of Warren; Andrew J. Szewczyk, Harper Woods; Frank A. McCabe, Detroit; Richard A. Schlaf, Sterling Heights; Leonard A. Gabriele, Warren, all of Mich.

[73] Assignee: Lear Siegler, Inc., Santa Monica, Calif.

[21] Appl. No.: 810,307

[22] Filed: Jun. 27, 1977

Related U.S. Application Data

[63] Continuation-in-part of Ser. No. 734,301, Oct. 20, 1976, Pat. No. 4,065,222.

[51] Int. Cl.² .......................... B23F 1/00; B23F 9/04; B23D 41/06
[52] U.S. Cl. ............................................. 90/1; 90/10; 90/86
[58] Field of Search .................................. 90/1, 10, 86

[56] References Cited

U.S. PATENT DOCUMENTS

| 3,656,401 | 4/1972 | Psenka | 90/10 |
|---|---|---|---|
| 4,027,574 | 7/1977 | Russell | 90/10 |

FOREIGN PATENT DOCUMENTS

| 866,377 | 5/1941 | France | 90/10 |
|---|---|---|---|

Primary Examiner—Harrison L. Hinson
Attorney, Agent, or Firm—Whittemore, Hulbert & Belknap

[57] ABSTRACT

A pot broaching machine for cutting small pinions from the solid for use with a pull-up broaching machine, the pot having a multiplicity of solidly abutting flat-sided internally toothed cutting rings and internally slotted support rings, with elongated toothed sticks received in the slots of said support rings, automatic loading and unloading means, and guide means to guide a work blank as it enters the broach.

10 Claims, 14 Drawing Figures

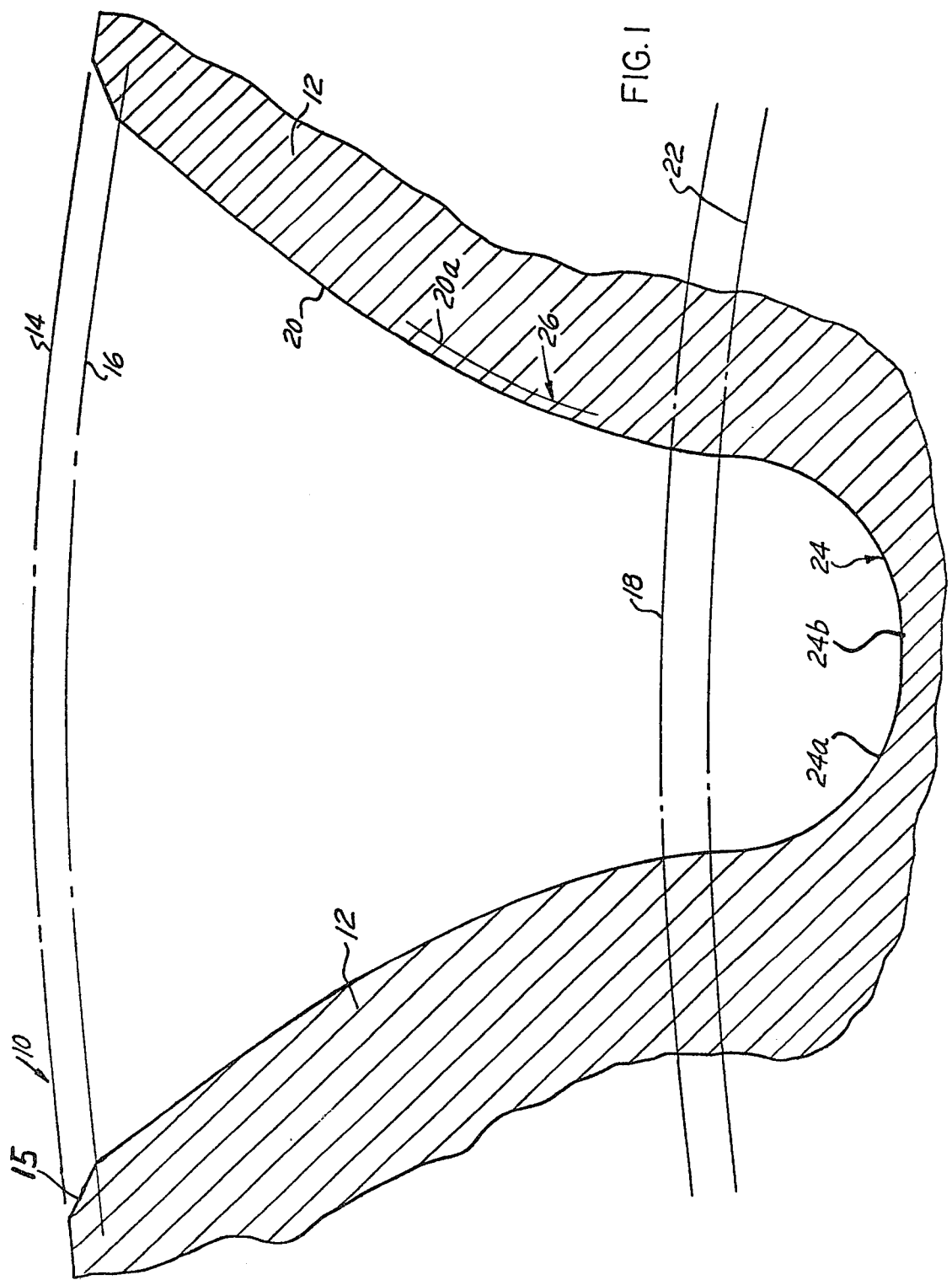

POT BROACH

CROSS-REFERENCE TO RELATED APPLICATION

The present application is a continuation-in-part of copending application Ser. No. 734,301, filed Oct. 20, 1976, now Pat. No. 4,065,222.

BRIEF SUMMARY OF THE INVENTION

The problem of broaching transmission pinions from cylindrical steel blank having in some cases outside diameters of less than two inches offers many difficulties. One of these is in machine design in which the parts withstand the forces required to relatively move the broach and workpiece. Another is the problem of machining cutting teeth at the inside of an elongated pot.

The first problem is solved in the present invention by pulling the workpiece through the pot broach by an elongated pull rod having sufficient strength in tension to transmit the required force, while at the same time guiding the workpiece until it is adequately supported by cutting teeth in the broach.

The second problem is solved by providing a pot broach assembly of special design, using a multiplicity of laterally abutting, flat-sided rings, some of which have internal cutting teeth and some of which are slotted and support toothed sticks in their slots.

By the present invention it is possible for the first time to produce pinions in a single stroke of a smaller diameter, wider face widths, and having deeper tooth spaces than heretofore.

BRIEF DESCRIPTION OF THE DRAWINGS

FIG. 1 is a more or less diagrammatic view illustrating the sequence of cuts in a single tooth space.

COMPLETE DESCRIPTION

Figure 5:
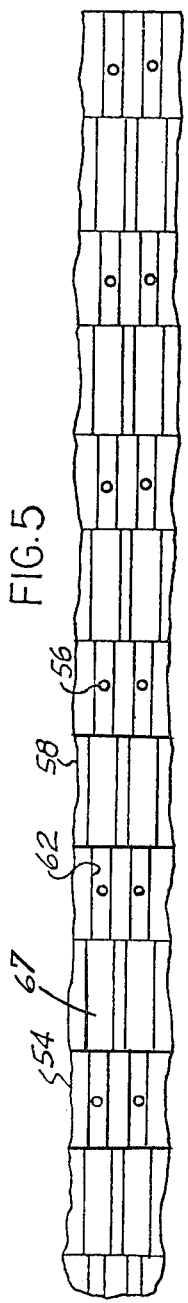
FIG. 5 is a fragmentary elevational view as seen at the arrows S—S, FIG. 3.

The problem of broaching the small pinions used in automobile transmissions is complicated by the small size of the opening through a blank onto which teeth are to be cut, which precludes applying force to the blank by a rod under compression. The broaching machine disclosed herein employs a tension rod passing through the gear and adapted preferably to pull the blank through the pot broach. Alternatively, of course, the pull rod may support the blank, while the pot broach is moved over the blank.

Referring first to FIG. 1, there is illustrated a single tooth space cut into a blank 10 by the broach teeth between gear teeth 12.

Initial cuts are taken by a sequence of chamfer cutting teeth provided on the cutting rings at the leading end of the broach. These teeth cut from the internal originally cylindrical surface 14 of the blank to a predetermined chamfer diameter indicated by circle 16, and form the chamfers indicated at 15. In a practical embodiment of the invention, the chamfer is formed by seven chamfer cutting rings.

The following rough cutting rings cut sequentially to greater depth and remove material slightly below the circle 18 which represents the start of active profile (SAP) on the gear teeth 12. It will be understood the tooth profiles 20 are roughly approximated, and that these are generally involute profiles, as required by modern practice in running gears. In a practical embodiment of the present invention, the material between circles 16 and 18 is removed by fifty-four rough cutting rings.

The pinions require cutting or undercutting below the start of active profile, and below the involute base circle 22, and this is accomplished by a plurality of toothed sticks, one for each tooth space, each of which removes material between line 18 and line 24, the latter representing the bottom of the tooth space. The final tooth on each stick conforms to line 24 which includes arcuate portions. Preferably, the bottom of the tooth space has a narrow straight portion 24b tangent to arcuate portions 24a. In a practical embodiment of the invention, the material between lines 18 and 24 is removed by thirty-nine teeth on each stick.

Finally, the sides of the teeth 12 are finish cut by the teeth of a few finish cutting rings, the teeth being shaped to cut the full involute form between chamfers 15 and the undercut surfaces 24. For this purpose, the cutting teeth are of full height, and successive teeth are of slightly increasing width to take very accurate side shaving cuts indicated in part and merely diagrammatically at 26.

In a practical embodiment of the present invention, the material removed between the line 20 representing the rough cut involute surface and the line 20a, representing the finished involute surface is only 0.004 inches, and accomplished by twelve finish cutting rings, preferably stepped so that all finished cutting rings take substantially equal cuts.

Figure 2:
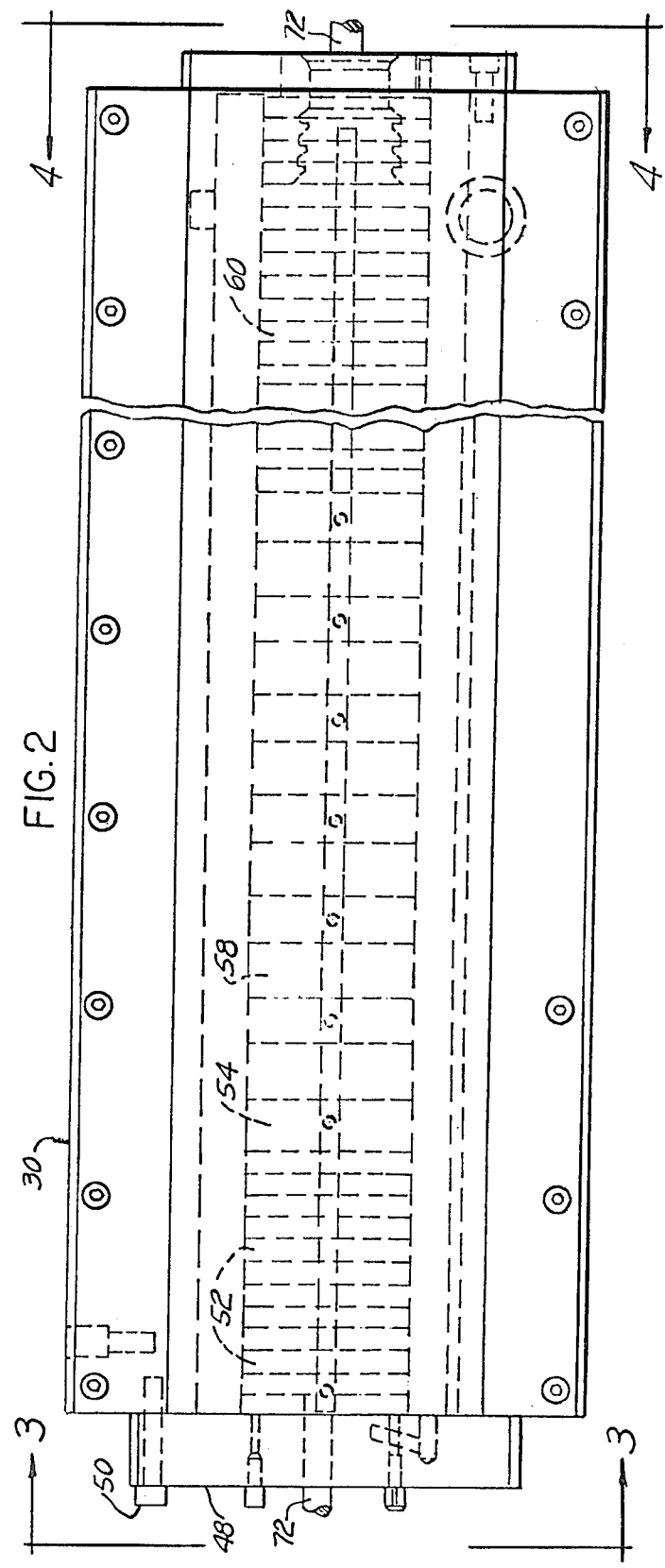
FIG. 2 is an elevational view of the pot broach.
Figure 4:
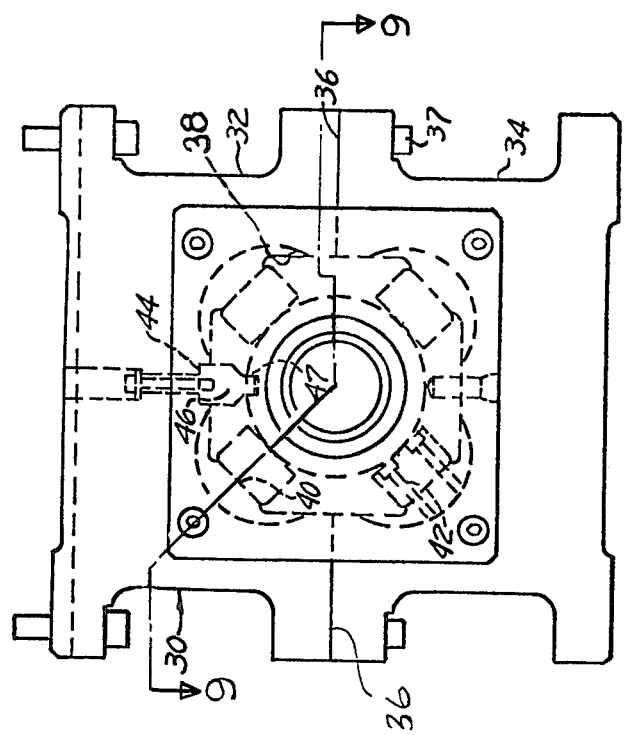
FIG. 4 is an end view of the broach, viewed in the direction of arrows 4—4, FIG. 2.
Figure 3:
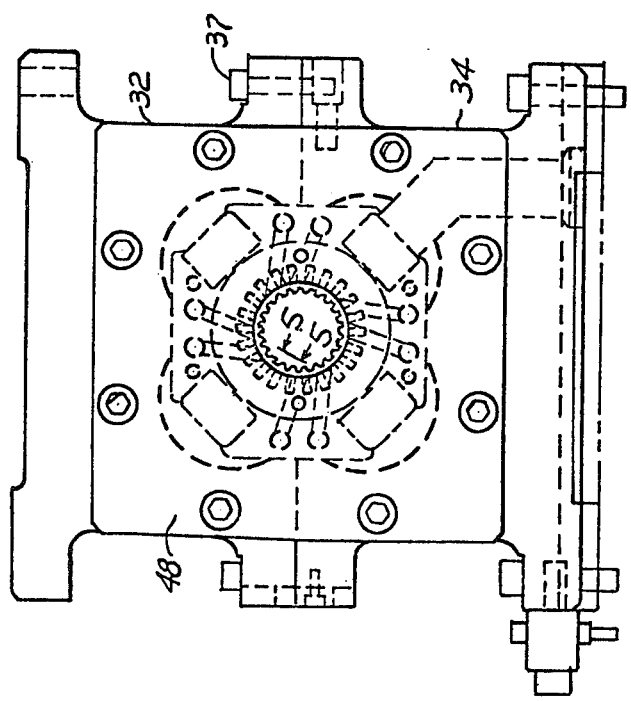
FIG. 3 is an end view of the broach, viewed in the direction of arrows 3—3, FIG. 2.
Figure 7:
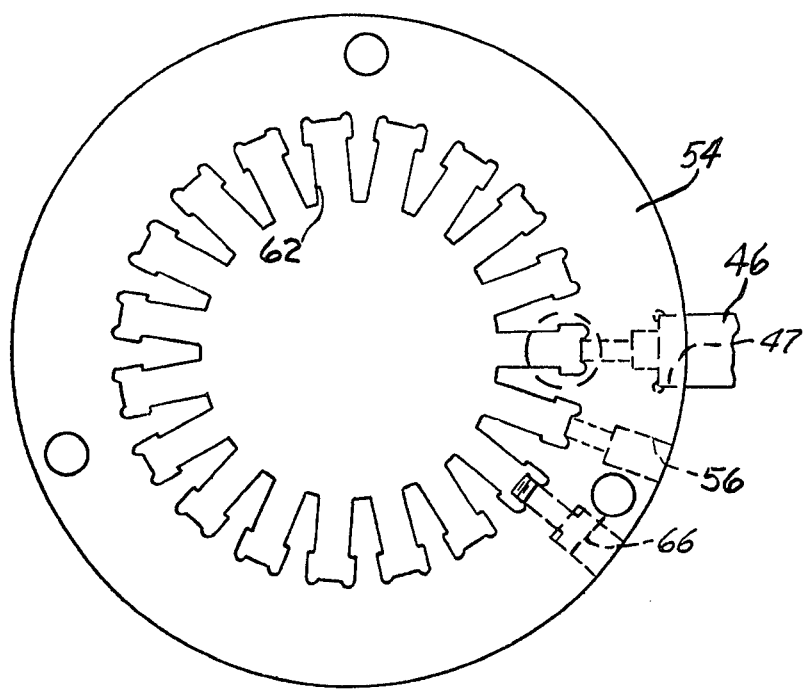
FIG. 7 is an elevational view of a stick supporting ring.

Referring now to Figures 2–8, details of the pot broach assembly are best illustratd in FIGS. 2-4.

The pot which supports the cutting elements is in general an elongated body 30 of generally square cross section formed of two halves designated 32 and 34 and meeting or substantially meeting at the line 36, and urged together by bolts 37 to clamp rings contained therein firmly. Each of the members 32 and 34 has a channel 38 formed therein, each channel having two longitudinally extending ribs 40 having an accurately finished flat surface supporting ring abutting bars bolted thereto as indicated at 42. One of the members, here shown as the trough member 32, is provided with a longitudinally extending groove 44 which receives a key 46 having a narrow key portion extending into an accurately located keyway 47 provided in each of the rings later to be described.

At the trailing end of the pot 30 is an abutment block 48 rigidly affixed thereto by bolts 50 and having attachments for connection to high pressure oil supplied to the interior of the pot.

Within the pot, and backed up against block 48 are a multiplicity of rings. At the trailing end of the pot broach, or the end which does the final cutting are the side shaving or full form finish rings 52. Forwardly of finish rings 52 are a series of stick supporting rings, rings 54 being provided with enlarged counterbored bolt holes 56 and rings 58 being generally similar but lacking the bolt holes of rings 54.

Forwardly of rings 54, 58 are a multiplicity of internally toothed chamferring and rough cutting rings 60.

All of the rings 52, 54, 58 and 60 have flat sides and all are solidly abutted against each other, and the final finishing ring 52 is solidly abutted against block 48 to sustain the cutting thrust.

Stick supporting rings 54, as best seen in FIG. 5, have narrow slots 62 dimensioned to fit closely within elongated toothed sticks 64 (see FIG. 8) and the bolt receiving openings 56 open into the bottom of slots 62, and headed bolts 66 extend through these openings and into tapped blind holes 68 to retain sticks in place. It will be recalled that all rings are accurately located circumferentially by keys 46 and keyways 47.

In addition, it is essential that sticks 64 are adequately supported to sustain cutting thrusts, and for this purpose the sticks are slightly shorter than the aggregate length of slots in rings 54, 58, and bolt holes 56 are slightly enlarged so that while bolts 64 hold the sticks down tightly against the bottom of the slots, the trailing ends of the sticks solidly abut the leading finishing ring 52.

The rings 58 are provided with radial slots 64 which are aligned with slots 62 but are slightly wider so that they do not engage the sides of the sticks. The bottoms of the slots 64 are, however, at the same radial spacing as the bottoms of slots 62, so that the radially outer edges of sticks 64 are solidly supported throughout.

Figure 6:
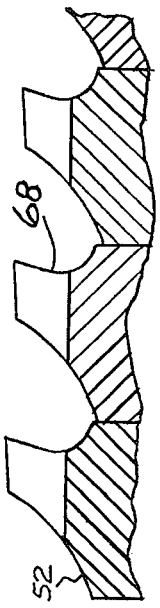
FIG. 6 is a fragmentary sectional view through a few rings provided with cutting teeth.

Referring now to FIG. 6, a few of the cutting rings are shown. These may be the finishing rings 52 or the last few roughing rings 60 but are here designated 52. Each ring has a multiplicity of internal teeth 68, which are radially stepped if roughing teeth, or of increasing width if side shaving finishing teeth. Since each ring has only a single circumferential series of spaced teeth, the teeth may be accurately ground without difficulty.

Figure 8:
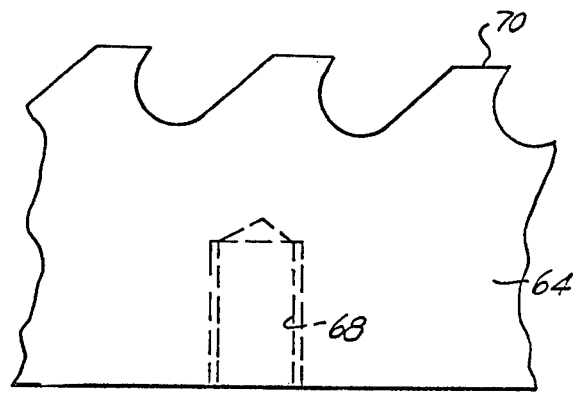
FIG. 8 is a fragmentary elevational view of a portion of a stick.
Figure 9:
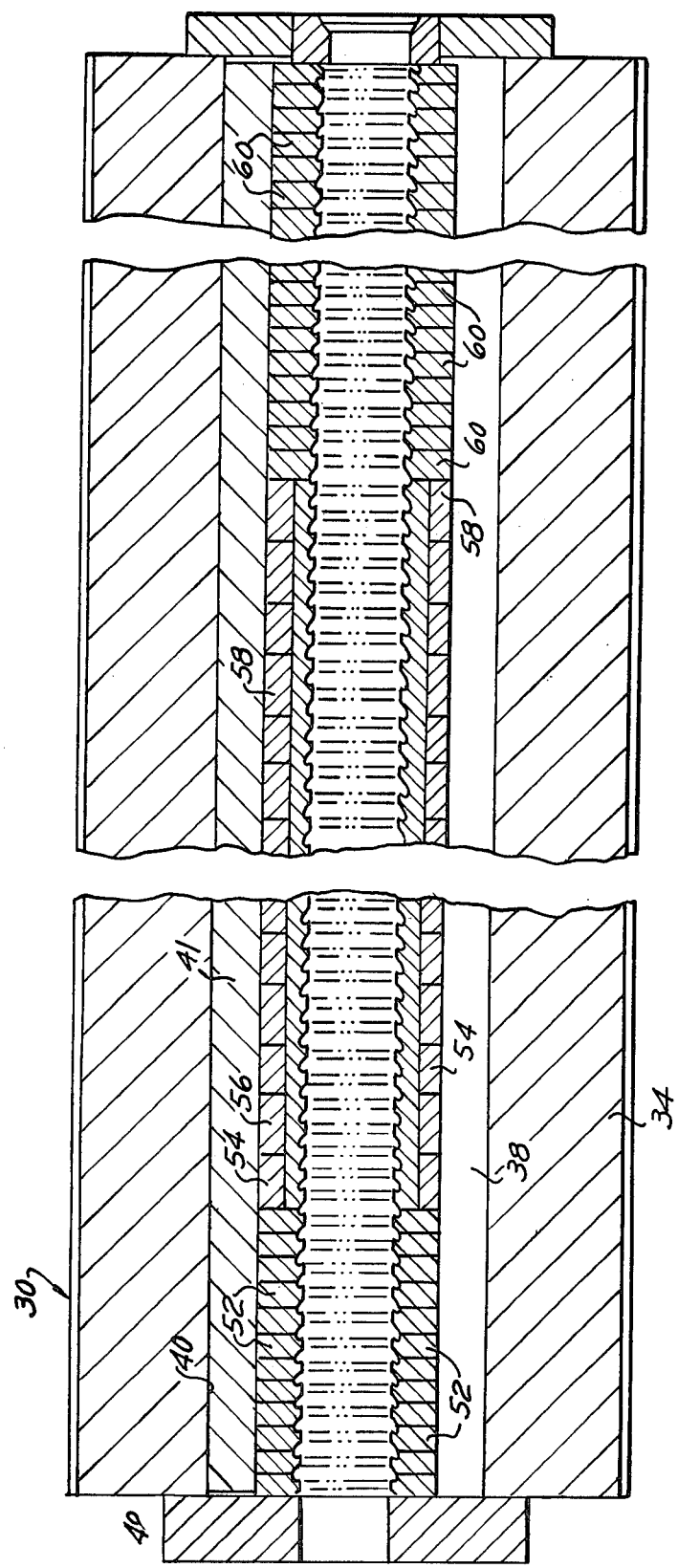
FIG. 9 is a sectional view on line 9—9, FIG. 4.

In FIG. 8 there is shown a piece of a stick 64, having a series of teeth 70 which are progressively increasing height rearwardly to cut the tooth spaces to the full depth. Each stick has a plurality of blind tapped holes 68 for reception of bolts 66 as heretofore described.

In practice, the pot broach 30 is fixedly mounted and a workpiece is drawn through the broach, preferably upwardly, by a pull rod, a portion of which is illustrated at 72 in FIG. 2.

Figure 10:
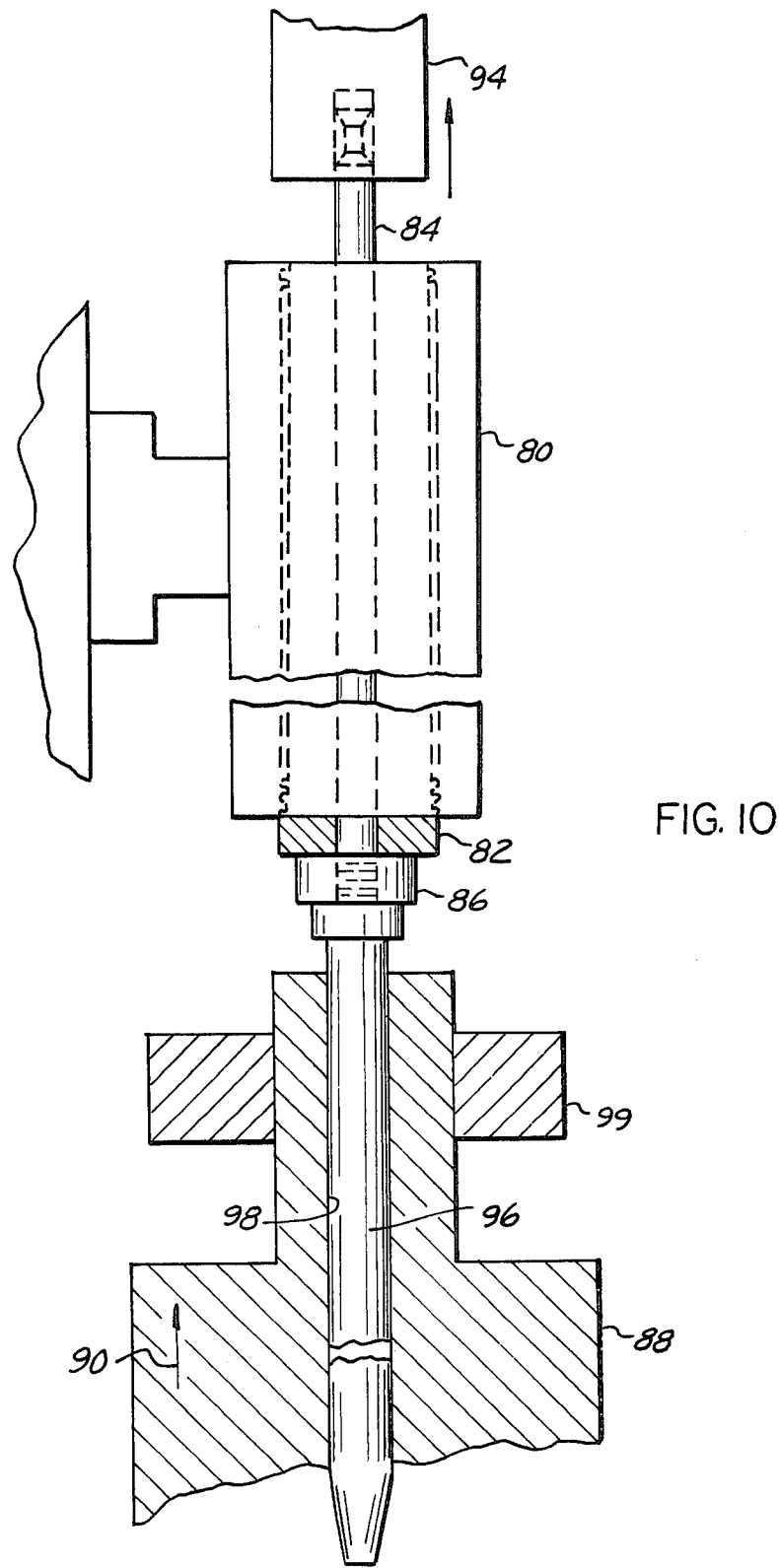
FIG. 10 is a diagrammatic view of the machine.
Figure 11:
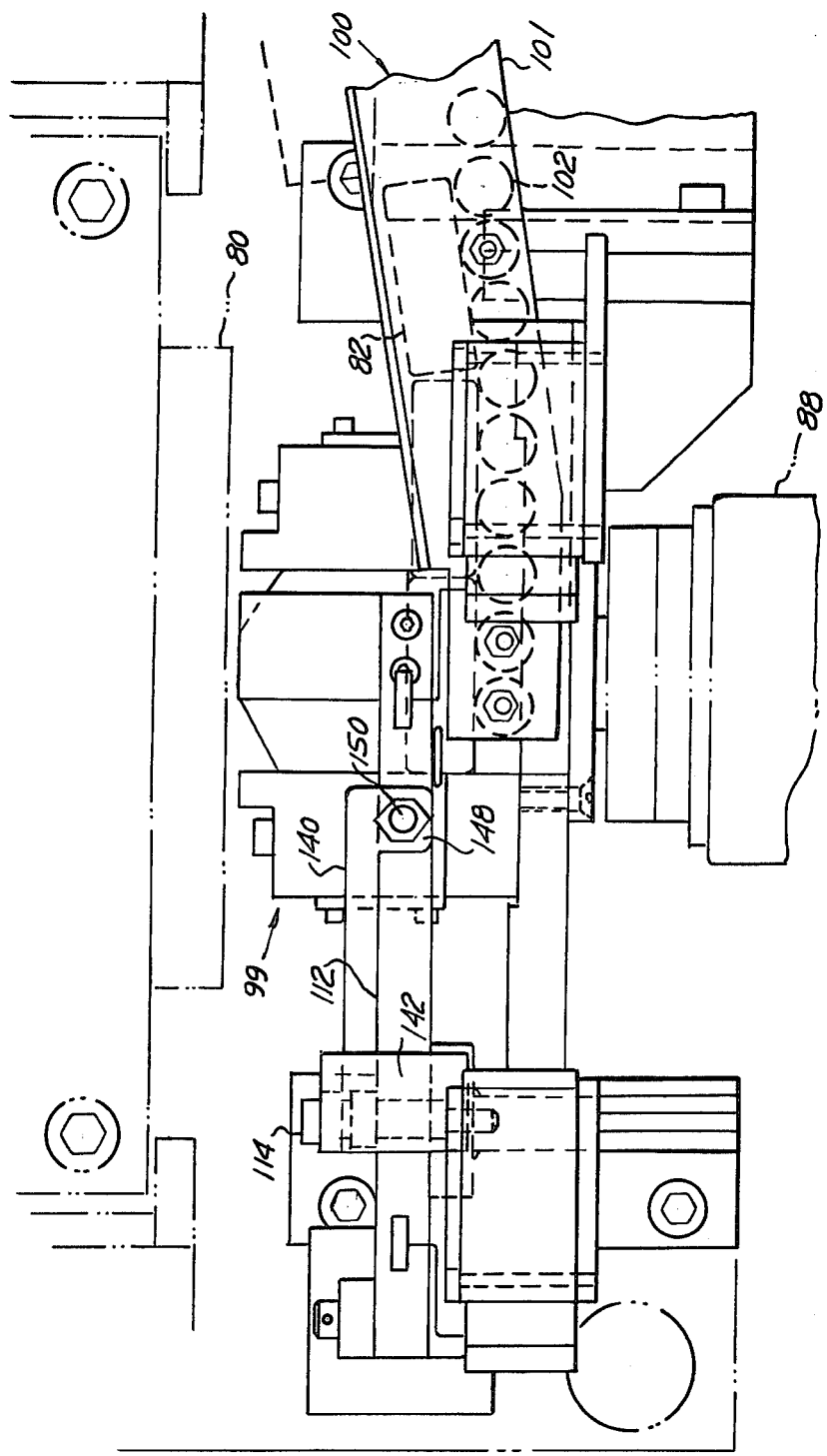
FIG. 11 is an elevational view of the loading mechanism.

Referring now to more or less diagrammatic FIG. 10, a portion of a pot broach is shown at 80 through which an annular work blank 82 is to be pulled by a pull rod 84. At its lower end the pull rod is detachably secured to a head 86 dimensioned to support the blank 82 and to pass through the broach without contacting the cutting teeth therein. A retriever 88 is vertically movable on the frame, as indicated by arrows 90.

The pull rod 84 is illustrated as having a diameter dimensioned to pass through the central hole in the annular blank 82. The upper end of the rod is shaped for detachable connection to a puller slide 94, which may be actuated by a hydraulic piston and cylinder device.

The head 86 includes an elongated cylindrical guide extension 96 movable in a guide opening 98 in retriever 88, and upon upward movement picks a blank 82 from a locating support illustrated diagrammatically at 99. With the parts in the position shown in FIG. 10, puller 94 is actuated to move vertically upwardly. Retriever 88 is stationary, so that as work blank 82 enters the broach, guide extension 96 is slidably guided in opening 98 in the retriever. In a practical embodiment of the invention, the guide extension is about 20 inches in length, so that the lower end of the pull rod is maintained in accurate concentricity with the broach until the workpiece has traveled a substantial distance into the broach, at which time the spline major diameters in the rings take over the guiding action.

When the finished gear is moved out of the upper end of the broach it is retained by suitable jaws, not shown, and the pull rod is then moved downwardly so that the tapered lower end of guide extension 96 enters opening 98 in the retriever 88, which is lowered and lowers the pull rod until its upper end is below the position occupied by the next workpiece. When the upper end of the pull rod has moved downwardly through the finished gear, the gear is removed laterally. A new work blank is positioned above the upper end of the pull rod, and the retriever then elevates the pull rod until head 86 engages the underside of the gear 82, and the upper end of pull rod 84 is again coupled to puller 94.

Reference is now made to FIGS. 11–14 which show automatic loading and unloading mechanism so that broaching of a succession of gears continues in a fully automatic manner. Suitable control switches and circuits are not shown, and are provided as required in an obvious manner.

An in-chute 100 is provided, having an inclined portion 101 provided with rollers 102 along which a series of annular blanks, here designated 82, advance by gravity to the locating support, designated in its entirety at 99. The leading blank, designated 82a in FIG. 12, engages a stop surface 106 and actuates an arm 108 of a limit switch 110. A pusher lever 112, pivoted at 114, is actuated by a hydraulic piston and cylinder device 116 and pushes the leading gear blank 104 from the position illustrated at 82a to the position 82b where it abuts vertical locating and guide blocks 118 and 120, and underlies resilient retainers 122, which have inwardly facing cam surfaces which permit the blanks to force the retainers outwardly as the blank is drawn upwardly.

The lever 112 has an arcuate stop surface which retains the series of blanks against forward motion as the leading blank is cammed inwardly onto the locating and support fixture 99. When the lever returns to its initial position, the series of blanks 82 again advances to position the leading blank in position to be displaced into axial alignment with the broach.

At the top of the broach 80, there is provided an unloader comprising a fixture 120 having a central opening through which a finished gear, here designated G, is moved vertically upwardly by head 86 on pull rod 84. Within the fixture are two resilient slide catches 122 urged inwardly by springs 124 but having cam surfaces 126 which permit the gear G to cam the catches outwardly, after which they spring back and retain the finished gear in the fixture as the drawbar 84 is moved downwardly to engage the gear supporting head in the retriever 88. The drawbar is then uncoupled from the slide 94 and the retriever lowered until the upper end of the drawbar moves below the gear G. At this time, a pusher 130 is actuated by hydraulic piston and cylinder device 132 and ejects the finished gear into a downwardly inclined delivery chute 134.

Figure 12:
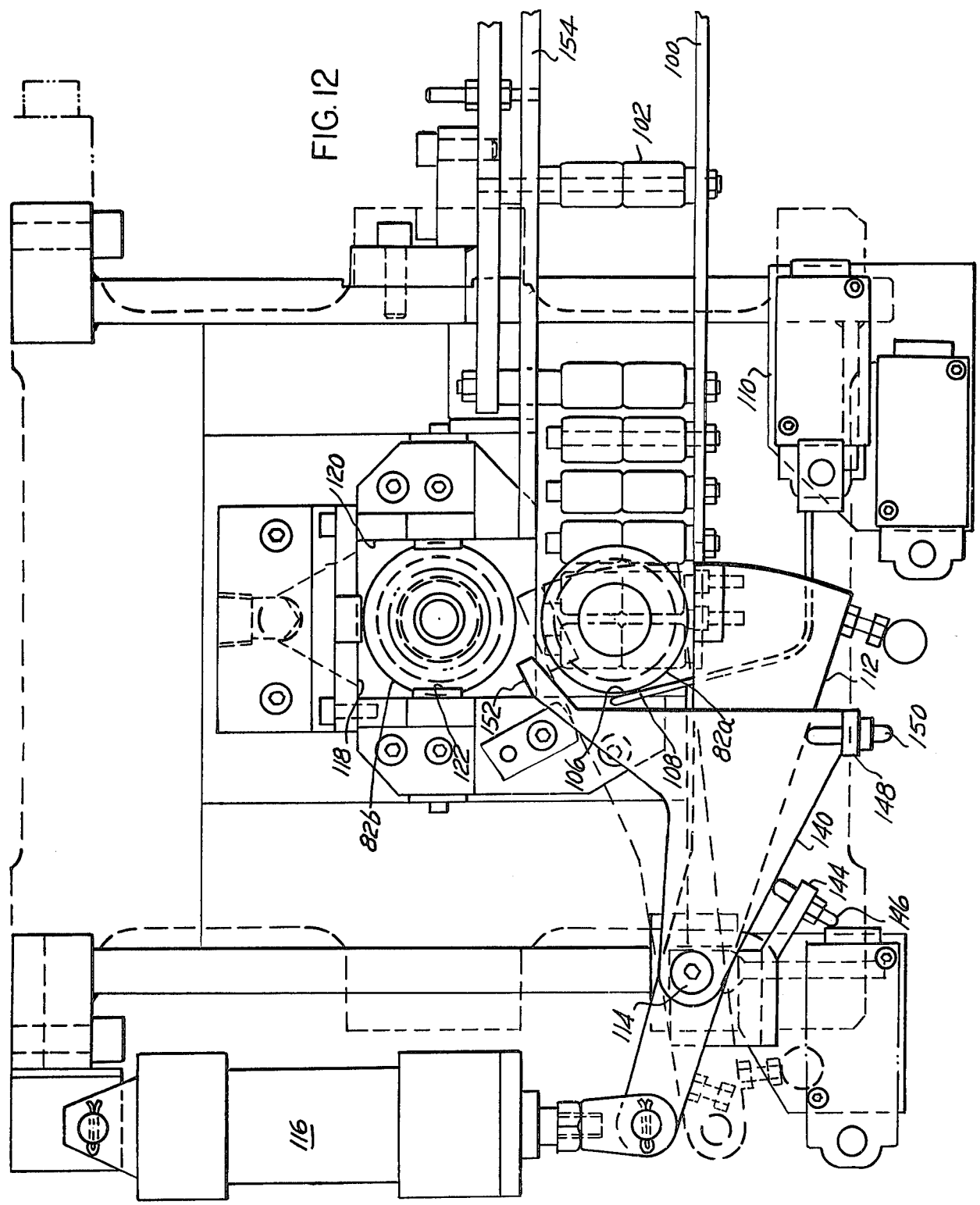
FIG. 12 is a plan view of the loading mechanism.
Figure 13:
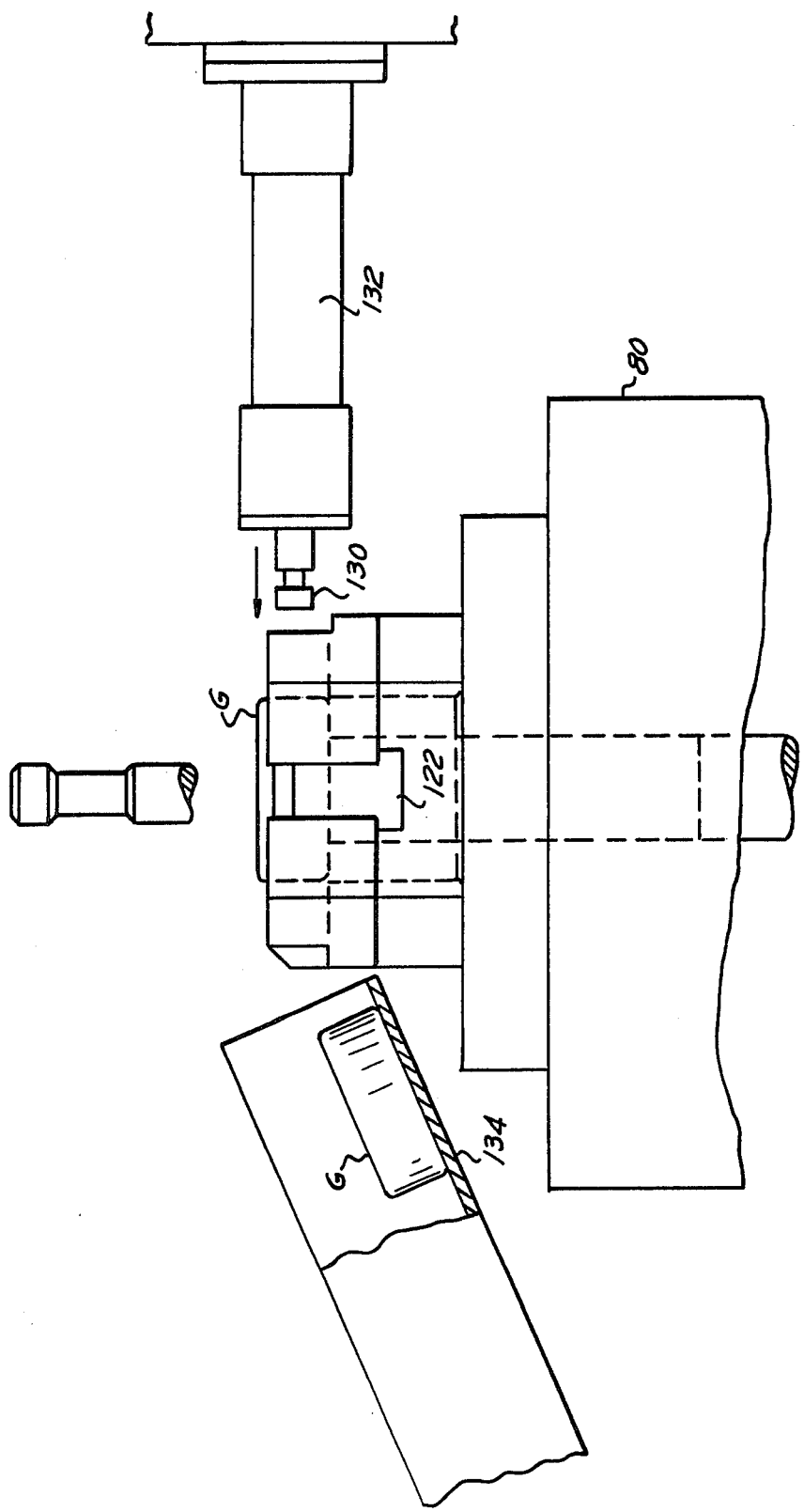
FIG. 13 is a vertical fragmentary sectional view of the unloading mechanism.
Figure 14:
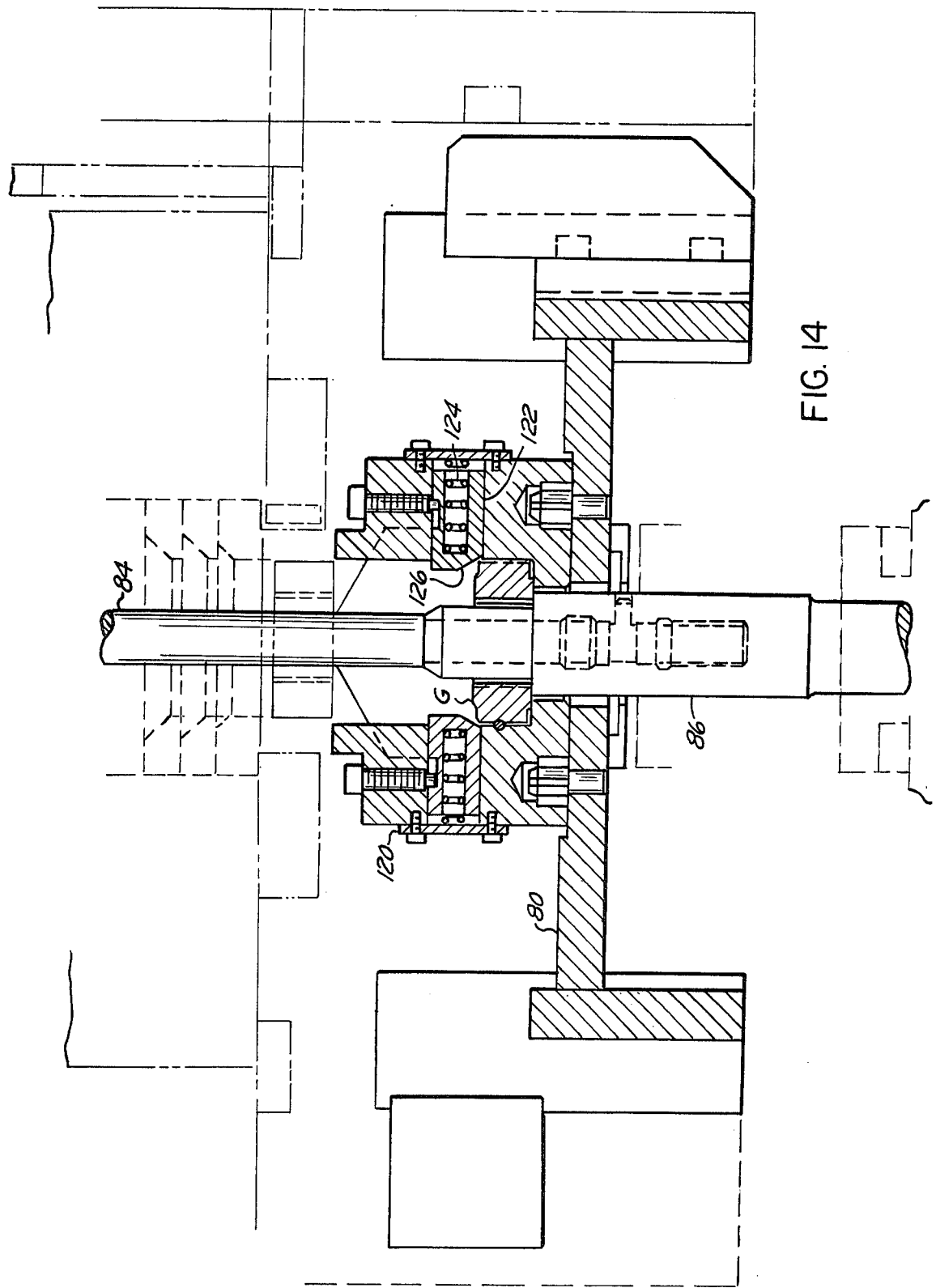
FIG. 14 is an elevational view, partly in section, of the unloading mechanism.

Under certain circumstances, the pressure derived from a multiplicity of gear blanks 82 on the inclined ramp including rollers 102 tends to force the leading blank (indicated at 82a in FIG. 12) toward loading position (indicated at 82b in FIG. 12). In order to prevent this, a separately independently pivoted blocking lever 140 may be provided.

Lever 140 is pivoted at 114 to the same pivot means which mounts pushed lever 112. A plate 142 is bolted to the frame and includes a stop arm 144 having an adjustable stop screw 146 engageable with an edge of lever 140 to limit clockwise movement thereof as seen in FIG. 12. Lever 140 carries a stop plate 148 provided with adjustable stop screw 150.

Blocking lever 140 has an inclined blocking finger 152 which in the position shown in FIG. 12, positively prevents displacement of a blank from position 82a toward 82b until the pusher lever 112 is actuated. At such time, a work blank engages finger 152 and blocking lever 140 is moved by the work blank as the blank is positioned against guide block 118. It has been found that friction between levers 112 and 140 is sufficient to restore lever 140 to illustrated position when lever 112 is returned to full line position, FIG. 12.

The foregoing permits adjustment of blocking lever relative to pusher lever to provide for different size blanks 82. The guide rail 154 of chute 100 is adjustable laterally to accommodate different size blanks, and the action of blocking lever 140 may be adjusted by screws 146 and 150 in accordance with the diameter of the work blank.

What is claimed is:

1. A vertical pull-up pot broaching machine, comprising a rigid frame, a generally tubular pot broach mounted in a fixed position on said frame, said pot broach comprising a longitudinally segmental rigid tubular support body, a first series of flat-sided, abutting, internally toothed cutting rings, each ring having a multiplicity of cutting teeth in a single circumferentially extending array, a second series of flat-sided, abutting, locating and support rings, said second series of rings having internally open, radially extending, circumferentially spaced slots, flat-sided elongated sticks received in said slots, said sticks having progressively stepped cutting teeth adapted to remove material from the bottoms of tooth spaces but by the cutting teeth of said first series of rings, a slide on said frame above said pot broach, a drawbar detachably connected to said slide to be pulled vertically upwardly thereby through said pot broach, a work supporting seat adjacent the lower end of said drawbar, a retriever mounted on said frame below said pot broach for vertical movement thereon, means for moving said slide and retriever independently, an automatic loader comprising a locator having a horizontal support surface having a portion shaped to receive the foremost of a series of work blanks and a locating portion having a central opening to receive said drawbar and having a plurality of vertically extending guides to engage the periphery of a work blank to locate it in vertical alignment with said pot broach and to guide it during initial vertical movement thereof, a first pusher movable laterally into engagement with the foremost of a series of work blanks movable toward said locator, said pusher having a portion shaped to retain the series of blanks against advance as the leading blank is moved laterally onto the locating portion of said support surface, an unloader above the upper end of said pot broach comprising resilient means to engage and retain a finished gear in position as said drawbar is moved downwardly by said retriever, and a second pusher movable laterally of the finished gear to move it away from said resilient means toward a discharge chute.

2. A broaching machine as defined in claim 1, in which said first pusher comprises a pivoted lever and in which the portion shaped to retain the series of gears against advance in an arcuate abutment surface centered at the pivot axis of said lever.

3. A broaching machine as defined in claim 1, in which the drawbar has a guide extension below the work supporting seat, and said retriever has a guide opening in which said extension is movable.

4. A broaching machine as defined in claim 3, in which said extension has a length such that it moves out of said guide opening after a work blank on said seat is fully engaged by said cutting teeth.

5. A broaching machine as defined in claim 1, in which said unloader comprises a pair of fingers located diametrically with respect to a finished gear movable through the space between said fingers, guides mounting said fingers for movement toward and away from each other, resilient means connected to said fingers urging them toward each other, cam surfaces at the underside of said fingers engageable by a finished gear as it is moved vertically above said pot broach, said second pusher having a movable work engaging portion effective to move a finished gear laterally off of said fingers.

6. A pot type gear broaching machine comprising a frame, a pot broach fixed to said frame with its axis vertical, automatic loading structure comprising a loading station in directly axial alignment with said broach from which a work blank is moved vertically through said broach, a feed chute along which a series of work blanks are advanced to a preliminary locating station displaced laterally from said loading station, a pusher engageable with the side of a work blank at said preliminary locating station and movable to move the work blank to said loading station, a blocking member movable with said pusher and independently movable with respect thereto, said member having a blocking portion engageable with the work blank at said locating station and effective to prevent movement of the work blank toward said loading station, and abutment means acting between said pusher and member to limit relative movement therebetween.

7. A machine as defined in claim 6, in which said abutment means are adjustable to accommodate work blanks of different size.

8. A pot type gear broaching machine comprising a frame, a pot broach fixed to said frame with its axis vertical, automatic loading structure comprising a loading station in directly axial alignment with said broach from which a work blank is moved vertically through said broach, a feed chute along which a series of work blanks are advanced to a preliminary locating station displaced laterally from said loading station, a pusher lever having a pivot axis and a surface engageable with a side of a work blank at said preliminary locating station and movable from rest position to transfer the last mentioned blank to said loading station, said pusher lever having an arcuate stop surface engageable with the next successive blank to prevent the series of blanks from advancing until said pusher lever returns to rest position, a blocking lever independently pivoted to said frame on the same pivot axis as said pusher lever, said blocking lever having abutment means engaging said pusher lever to prevent movement of said blocking lever until said pusher lever moves on its stroke to advance a work blank engaging means effective to block the work blank at said preliminary locating station against movement toward said loading station, said blocking lever being freely movable by a work blank upon initial movement of said pusher lever in a pushing stroke to release the work blank for movement to said loading station, and a feeder device to move a work gear from said loading station through said broach.

9. A machine as defined in claim 8, in which said abutment means is adjustable to accommodate work blanks of different sizes.

10. A machine as defined in claim 8, in which feeder device is arranged to pull a work piece upwardly through said broach.

* * * * *